Patented Aug. 8, 1939

2,168,724

UNITED STATES PATENT OFFICE 2,168,724

FOOD PRODUCT AND PROCESS OF PRODUCING THE SAME

Paul A. Watson, Pasadena, Calif.

No Drawing. Application January 14, 1937,
Serial No. 120,619

7 Claims. (Cl. 99—9)

This invention relates to a food product and to the process of preparing the same.

The product is particularly suitable for use as a food for animals such as dogs, poultry, cattle and the like and forms a balanced ration containing all essential nutritive values in proper proportions. Although the product is a food which would be suitable for human beings, it is more especially valuable as a stock food by reason of the fact that the ingredients are inexpensive and the method of preparation is relatively simple.

It has been found that this product not only contributes nutrients in highly digestible form, but also increases the appetite of the animal or fowl. The digestion of the food is followed by a maximum degree of assimilation and the assimilation of any other food which may be provided will be greatly increased. It has also been determined that this food product stimulates the flow of digestive juices in the alimentary tract and the combination of ingredients exerts a healthful and cleansing effect on the intestines.

In addition to preventing diseases which are known to be due to vitamin deficiency, beneficial results are being obtained in the combating of a number of poultry diseases, which are, in most cases, of an intestinal nature, namely, pneumonia, coccidiosis, pullarom, and others.

Other advantages will be apparent from the following description.

The product preferably contains four ingredients, namely, middlings, malted barley, whey and buttermilk.

By "middlings" is meant the coarser part of ground wheat, as distinguished from ordinary flour or bran. This is more desirable than ordinary flour or bran or a mixture of flour and bran because of the high content of gluten which it possesses and which is the nutritious element of wheat.

Malted barley is barley that has been artificially germinated by heat and moisture.

Whey is a clear liquid, usually straw colored, consisting of water and milk sugar (lactose) that remains when casein and other ingredients are coagulated by rennet or acids.

Buttermilk is milk from which the butter has been removed or cultured skimmed milk, both of which may have been allowed to sour.

In making the food product, which is the subject of this invention, almost any commercial grade of the above ingredients is suitable. For example, dried buttermilk or dried whey may be used, although, in the preferred commercial embodiment, the buttermilk and the whey are in liquid form.

In preparing the food product the malted barley and middlings are preferably mixed in equal proportions (by weight).

The buttermilk and whey are separately mixed preferably in the proportions (by weight) of two parts of buttermilk to one part of whey, forming a liquid combination of buttermilk and whey.

The combination of malted barley and middlings is then mixed with the combination of buttermilk and whey, preferably in the proportions (by weight) of two parts of the grain combination to nine parts of the liquid.

In other words, if it is desired to produce 660 pounds of the food product, the following quantities of the ingredients will be used:

| | Pounds |
|---|---|
| Middlings | 60 |
| Malted barley | 60 |
| Whey | 180 |
| Buttermilk | 360 |

The proportions of buttermilk and whey to the total, which are given above, are based on the assumption that these ingredients are in liquid form, i. e., manufactured from ordinary milk without subsequent evaporation. If these ingredients are obtained from the manufacturer in dried form, a quantity of water may be added which is preferably equal to the amount which was originally removed.

The proportions of the various ingredients are not highly critical, but those proportions have been given which have been found to produce a satisfactory balanced ration. The proportions of any ingredient might, however, be increased or diminished by approximately 50% without greatly diminishing the value of the product.

After the grain and the liquid are mixed as above stated, the mixture is heated to a temperature which is preferably at least 180° F., and held at this temperature for at least several minutes after which, while still maintaining the temperature, it may be put into cans and hermetically sealed. The product may then be further cooked by raising the temperature from 180° F. to approximately 230° F., and creating a retort pressure of from ten to fifteen pounds. The mixture is held at this temperature and pressure for a period which is preferably at least forty minutes after which it is allowed to cool. It will be understood that the above described treatment will result in a vacuum packing of the product.

The initial heating to 180° F. assists certain reactions within the mixture which will be described below and the subsequent additional heating under pressure has the effect of further cooking and sterilizing the product and insures that the package will retain the product in first class condition for an indefinite period of time.

After the package is cooled, it is labelled and is then ready for distribution.

The superior qualities and the advantages of the food product so prepared are due, largely, to the fact that the constituents of the various ingredients named above interact to produce valuable compounds not present in any of the original ingredients. Although the present knowledge of these interactions or reactions between the original ingredients is not complete, the value of this invention will become more apparent when the following facts are taken into consideration.

It will be noted that the buttermilk contains proteins, mineral elements including calcium and phosphates, lactose and a small amount of fat. In the preparation of the buttermilk, certain micro-organisms including lactobacillus acidophilus, streptococcus lactus and others, bring about lactive acid fermentation by transforming the lactose of the milk into lactic acid. The milk also contains vitamins A, B, C, D and G in substantial quantities, as well as a minimal amount of vitamin E.

The whey contributes, principally, a large amount of lactose and a relatively large amount of vitamin G. It will be noted that vitamin G tends to promote growth and tends to prevent certain diseases such as pellagra, "black tongue" and similar vitamin deficiency diseases. Recent investigation shows that vitamin G is made up of two components and a high percentage of the component called lacto-flavin, particularly valuable in promoting growth, is present in whey.

The middlings contribute a high percentage of starch and gluten (a protein comprising approximately 50% glutelin and substantially 50% gliadin), as well as valuable mineral compounds. The middlings also are characterized by the presence of relatively high quantities of vitamins A, B, E and G.

The malted barley furnishes proteins, starch, minerals and vitamins A, B and E. In addition, the malted barley supplies the mixture with an abundance of enzymes such as diastase, lipase, amylase, peptase, itase, pectase, and others.

As the result of the action of the enzyme diastase the starch present in the mixture is converted to maltose. Other enzymes probably contribute to this conversion, but the presence of diastase is undoubtedly the most important factor. As a result of this conversion, the starch may be said to be predigested in the sense that it is changed into a sugar which, in turn, may be assimiliated. The middlings could not furnish maltose were it not for the enzymes present in the barley and nearly twice as much maltose is produced by the combination as would be produced by the malted barley alone.

The maltose is a disaccharide, as is also the lactose present in the buttermilk and whey. While these carbohydrates are assimilable to a certain extent, a much more satisfactory food results from the conversion of a substantial proportion of the disaccharides to monosaccharides.

As a result of the action of the lactic acid organisms present in milk, a substantial proportion of the lactose is converted to lactic acid. The presence of lactic acid causes the mixture to be slightly acid and therefore, when the mixture is heated, the maltose and lactose are hydrolyzed. The maltose is converted into dextrose upon hydrolysis and the lactose is similarly converted to a mixture of dextrose and d-galactose.

The monosaccharides resulting from this conversion may be quickly assimiliated by the animal. It is thus possible to produce a food product containing an exceptionally high proportion of available sugars and the sugars which result from the hydrolysis of lactose and maltose are much more desirable from a physiological point of view than are disaccharides such as can sugar, maltose or lactose.

It will be seen that this conversion is brought about as the result of the combination of buttermilk, containing lactic acid and lactose, and a source of maltose such as middlings and malted barley.

It will be understood that not all of the disaccharides are converted to monosaccharides in this process and that a substantial amount of maltose and lactose remains. An animal is, therefore, provided with a diet which contains several types of sugar.

In addition to bringing about hydrolysis of the sugars, the lactic acid has the effect of assisting the enzymatic conversion of starch to maltose, referred to above.

It will also be understood that each of the enzymes, furnished by the malted barley, has a particular function. Some begin the splitting-up of the proteins in the ration, some begin the splitting-up of the peptones in the ration, some begin the splitting-up of the fats in the ration and they, therefore, supplement the enzymes which are secreted by the animal during the normal digestion of its food.

It has been determined that nitrogenous compounds may be assimiliated more readily from this ration than from any other previously known. It is well known that, in order for poultry to assimiliate sufficient nitrogenous compounds for their needs, it has previously been necessary to include a great deal more of these expensive compounds than the poultry could actually assimilate, the balance, often as high as 15%, being waste. By the use of this ration the amount of nitrogenous compounds which is wasted is greatly reduced, while the health of the poultry is at the same time materially benefited.

It is to be understood that only the preferred commercial form of the invention has been described above and that various changes might be made in the composition and the process without departing from the scope of the invention. For example, the use of whey might be dispensed with if sufficient lactose and vitamin G were furnished in some other manner. The middlings might be replaced by some other cereal product if it contains sufficient starch, protein and vitamin E. Similarly, the other ingredients might be replaced by equivalent sources of their essential constituents. It has also been found that the product is improved by the addition of a fish oil, for example, cod liver oil or halibut liver oil.

I claim:

1. A liquid animal food comprising the reaction product of buttermilk, middlings and malted barley, a substantial portion of the lactose of the buttermilk having been hydrolyzed to form monosaccharides, and a substantial portion of the starch of the middlings having been converted to sugar by the action of the enzymes of the malted barley.

2. A liquid animal food comprising the reaction product of buttermilk, middlings and malted barley, a substantial portion of the lactose of the buttermilk having been hydrolyzed to form monosaccharides, a substantial portion of the starch of the middlings having been converted to maltose, by the action of the enzymes of the malted barley, and a portion of said maltose having been hydrolyzed to form monosaccharides.

3. A liquid animal food comprising the reaction product of buttermilk, middlings, malted barley and whey, a substantial portion of the lactose of the buttermilk and whey having been hydrolyzed to form monosaccharides, and a substantial portion of the starch of the middlings having been converted to sugar by the enzymes present in the malted barley.

4. A liquid animal food comprising the reaction product of buttermilk, middlings, malted barley and whey, a substantial portion of the lactose of the buttermilk and whey having been hydrolyzed to form monosaccharides, a substantial portion of the starch of the middlings having been converted to sugar by the enzymes present in the malted barley, and a substantial portion of said maltose having been hydrolyzed to form monosaccharides.

5. The process of preparing a liquid animal food which comprises mixing buttermilk, middlings and malted barley, allowing the enzymes of the malted barley to convert to disaccharides a substantial portion of the starch present in the middlings and heating to a temperature and for a period of time sufficient to hydrolyze, in the presence of the lactic acid from the buttermilk, a substantial portion of said disaccharides.

6. The process of preparing a liquid animal food which comprises mixing buttermilk, middlings and malted barley, allowing the enzymes of the malted barley to convert to maltose a substantial portion of the starch present in the middlings and heating to a temperature and for a period of time sufficient to hydrolyze, in the presence of the lactic acid from the buttermilk, a substantial portion of the said maltose and the lactose of the buttermilk.

7. The process of preparing a liquid animal food which comprises mixing buttermilk, middlings, malted barley and whey, allowing the enzymes of the malted barley to convert to maltose a substantial portion of the starch present in the middlings and malted barley and heating to a temperature and for a period of time sufficient to hydrolyze in the presence of the lactic acid from the buttermilk, a substantial portion of said maltose and the lactose of the buttermilk and whey.

PAUL A. WATSON.